May 30, 1950         W. A. ROBINSON         2,509,452
DEVICE FOR EXTRACTING KERNELS FROM GREEN CORN
Filed Oct. 11, 1946         2 Sheets-Sheet 1
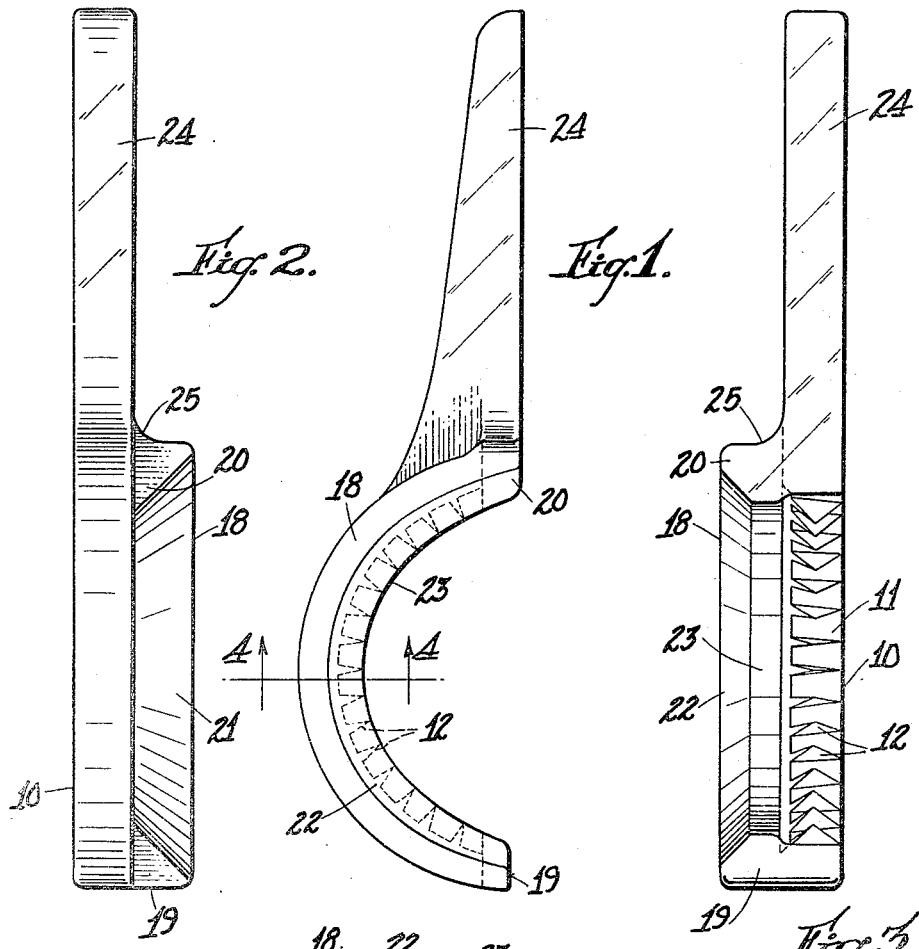
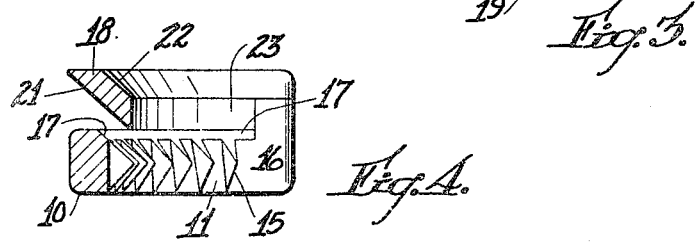
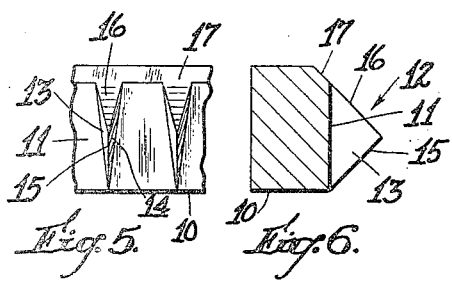
Inventor:
Ward A. Robinson
By
Chester A. Williams
Attorney

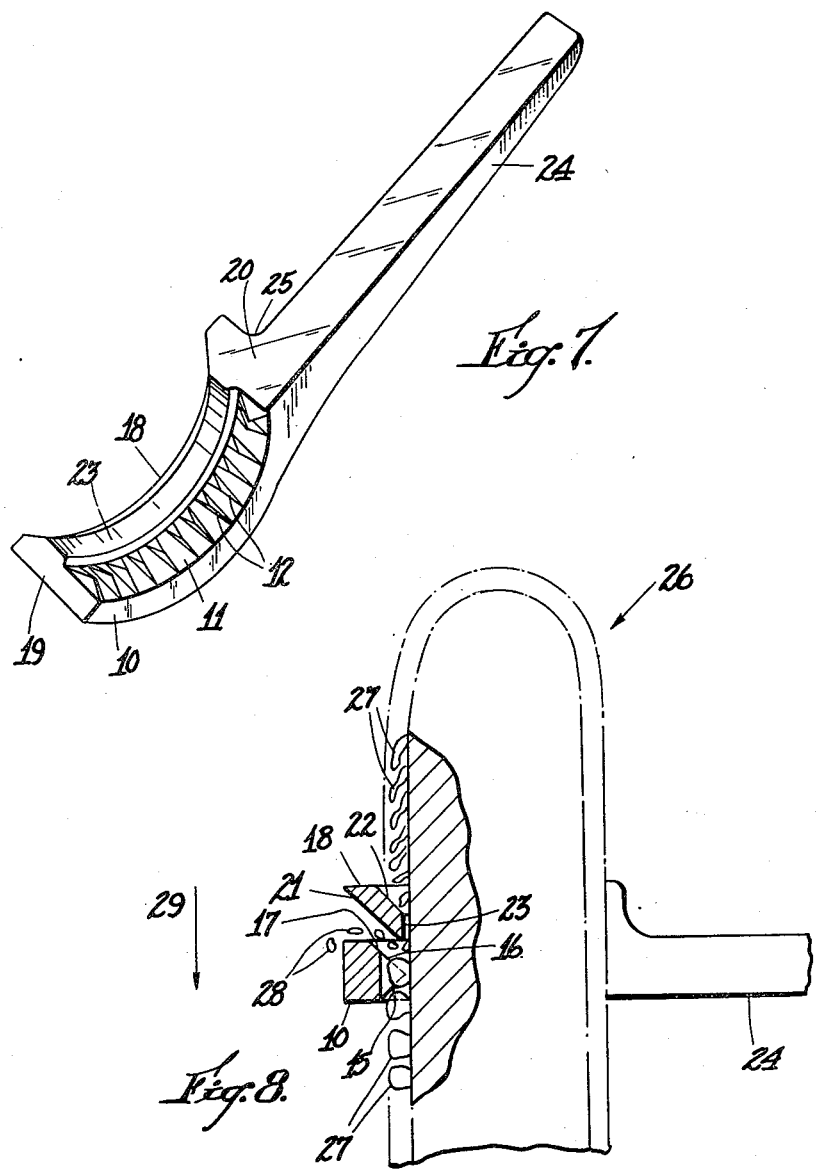

Patented May 30, 1950

2,509,452

UNITED STATES PATENT OFFICE 2,509,452

DEVICE FOR EXTRACTING KERNELS FROM GREEN CORN

Ward A. Robinson, Upton, Mass.

Application October 11, 1946, Serial No. 702,779

1 Claim. (Cl. 146—4)

The present invention relates to culinary utensils, and more particularly to a utensil for extracting the palatable kernels from the relatively unpalatable hulls of green corn, which individual hulls are left attached to the corn cob.

It is a primary object of the present invention to provide such a utensil which will have no relatively moving elements therein, and which at the same time will efficiently remove the edible kernels from the hulls while leaving the individual hulls on the cob.

A further objective of the present invention is to provide such a utensil which will be so constructed that it may be readily cleaned thereby to provide a most sanitary type of kitchen or table tool.

A still further object of the present invention is to provide a utensil of the above noted type which is designed so that it will control the flow of the corn kernels and the liquid corn milk to the end that the kernels and the milk will not indiscriminately fly in all directions as the kernels are removed from the cob.

With the above and other objects in view, as will hereinafter appear, the invention comprises the devices, combinations and arrangements of parts hereinafter set forth and illustrated in the accompanying drawings of a preferred embodiment of the invention from which the several features of the invention and the advantages attained thereby will be readily understood by those skilled in the art.

In the accompanying drawings:

Fig. 1 represents a top plan view of the present utensil.

Fig. 2 represents a left side view of the utensil shown in Fig. 1.

Fig. 3 represents a right side view of the utensil shown in Fig. 1.

Fig. 4 represents a sectional view taken substantially along the line 4—4 of Fig. 1.

Fig. 5 represents an enlarged front view of a pair of teeth as formed on the present unit.

Fig. 6 is an enlarged view, partly in section, representing a side view of one of the teeth disclosed in Fig. 5.

Fig. 7 represents a perspective view of the present utensil.

Fig. 8 is a diagrammatic drawing, partly in section, and illustrating the present device as it removes the kernels from the corn hulls.

Referring particularly to Figs. 1 and 4, the present device comprises a substantially segmental shaped tooth holder member 10 which has formed on the concave face 11, thereof a plurality of circumferentially spaced cuneated teeth 12. Referring particularly to Figs. 5 and 6, each of the teeth 12 is formed with a pair of converging faces 13 and 14 which intersect with each other to form an upwardly and outwardly sloping knife edge 15. The top portion of each of the teeth 12 is formed with a face 16 which slopes upwardly from the knife edge 15 to merge with a land or bevel portion 17 which is formed about the inner periphery of the tooth holder member 10.

Spaced coaxially of the tooth holder member 10 is a substantially segmental shaped compressor member 18 which is secured to the member 10 at the adjacent end portions thereof by means of bridge pieces 19 and 20. These bridge pieces 19 and 20 secure the members 10 and 18 rigidly together. Referring particularly to Fig. 4, the compressor member 18 is formed with a pair of concentric faces 21 and 22 each of which slopes upwardly in concentric relation with the land portion 17 formed on the member 10. The concave face 23 of the compressor member 18 is in line with the pointed portions of the teeth 12.

Projecting outwardly from the tooth holder member 10 is a handle portion 24 which merges into the bridge piece 20 as at 25 thereby to strengthen the entire unit.

In the operation of the present device, an ear of corn 26 (see Fig. 8) may be held in a vertical or near vertical position and the utensil is moved longitudinally of the ear so that the knives or teeth 12 will engage the hulls 27 of corn successively thereby to split them lengthwise of the ear. Due to the cuneal shape of each of the teeth 12 the individual corn hulls will not only be split lengthwise of the ear but they will be spread open thereby to facilitate the removal of the kernels 28 therefrom. After the knives have passed through the hulls to split and open the same, the concave face 23 of the compressor member 18 will engage the hulls to the end that the kernels will be squeezed out of the hulls. As may be seen in Fig. 8, the kernels 28 are forced out of the hulls 27 and then they are guided away from the ear of corn by the spaced concentric faces 17 and 21 of the respective members 10 and 18. This passageway thus formed by the faces 17 and 21 functions to direct the kernels away from the ear and at the same time it also functions to prevent the kernels and the liquid milk from the hulls from being indiscriminately thrown in all directions. The movement of the utensil in the direction of the arrow 29 is such that the outer wall portion of the face 21 will be effective to deflect the kernels and the milk so that they will drop downwardly thus to be deposited in a suitable container which may be placed beneath the corn ear.

As the hulls 27 are securely attached to the corn cob the compressor face 23 will merely squeeze the hulls thereby to remove the kernels but at the same time leaving the hulls attached to the cob.

Referring particularly to Fig. 1, the inner faces 11 and 23 of the members 10 and 18 are ovalescent in shape and thus the utensil may be used to remove kernels from corn having most any size diameter. In employing this utensil it is merely necessary to pass the same over the corn ear several times thereby completely to remove all of the corn kernels from the hulls.

It is to be understood that the present utensil is formed as a unitary device with no relatively moving element or elements which require adjustment. Furthemore, the present device is formed with no clefts in which dirt or food particles may become lodged. Therefore, the present invention presents a most sanitary kitchen or table tool as it may be readily and quickly washed and no particular care need be lavished upon it in order to clean the same. The present invention requires no adjustment between its respective elements as varying results may be effected with the device by altering the angle at which it is held as the same is drawn lengthwise over the corn. For example, the depth to which the teeth or knives 12 penetrate the individual hulls 27 may be increased or decreased by merely canting the utensil about the longitudinal axis of the handle 24.

It is also to be understood that the present utensil is designed so that it may be cast or molded from metal or plastic material as a unitary structure thereby to maintain the fabrication cost thereof at a minimum.

I claim:

A unitary device for removing kernels from corn hulls, comprising, a substantially segmental shaped tooth holder member, a plurality of cuneated teeth circumferentially spaced about the concave surface of said tooth holder member for splitting the corn hulls, each of said teeth having the upper portion thereof formed as a plane surface which slopes upwardly towards the inner peripheral portion of said tooth holder member, a substantially segmental shaped compressor member disposed substantially coaxially of and directly adjacent said tooth holder member for engaging the split hulls thereby to force the kernels therefrom, said compressor member having an inner concave hull-engaging face which is disposed substantially in line with the outer edge portions of said teeth, that face portion of said compressor member which is adjacent said tooth member being raked backwardly in substantial concentric relation with the upper plane surfaces of said teeth thereby to form a relatively narrow kernel-deflecting passageway with said tooth member, a pair of bridge pieces, each of said bridge pieces securing a respective pair of the adjacently spaced end portions of said segmental members rigidly together, and a handle element projecting from one of said bridge members so as to be disposed substantially at right angles to the common axis about which the concave surfaces of the tooth holder and compressor members are generated.

WARD A. ROBINSON.

REFERENCES CITED

The following references are of record in the file of this patent:

UNITED STATES PATENTS

| Number | Name | Date |
|--------|------|------|
| 287,080 | Anderson | Oct. 23, 1883 |
| 935,517 | Johnson | Sept. 28, 1909 |
| 961,825 | Wells | June 21, 1910 |
| 1,224,474 | Lake | May 1, 1917 |
| 2,326,873 | Meek | Aug. 17, 1943 |